(12) United States Patent
Jain

(10) Patent No.: US 11,108,481 B2
(45) Date of Patent: Aug. 31, 2021

(54) OVER-THE-AIR PROGRAMMING INTEGRATION WITH OVER THE TOP STREAMING SERVICES

(71) Applicant: Sling Media L.L.C., Foster City, CA (US)

(72) Inventor: Vikal Kumar Jain, Foster City, CA (US)

(73) Assignee: Sling Media L.L.C., Foster City, CA (US)

( * ) Notice: Subject to any disclaimer, the term of this patent is extended or adjusted under 35 U.S.C. 154(b) by 65 days.

(21) Appl. No.: 16/574,896

(22) Filed: Sep. 18, 2019

(65) Prior Publication Data

US 2021/0083787 A1    Mar. 18, 2021

(51) Int. Cl.
| | |
|---|---|
| *H04N 21/443* | (2011.01) |
| *H04N 21/426* | (2011.01) |
| *H04N 21/47* | (2011.01) |
| *H04H 60/43* | (2008.01) |
| *H04H 60/37* | (2008.01) |

(Continued)

(52) U.S. Cl.
CPC ............ *H04H 60/43* (2013.01); *H04H 20/61* (2013.01); *H04H 20/71* (2013.01); *H04H 60/372* (2013.01); *H04N 21/42638* (2013.01); *H04N 21/4431* (2013.01); *H04N 21/47* (2013.01)

(58) Field of Classification Search
CPC ...... H04H 60/43; H04H 60/372; H04H 20/71; H04H 20/61; H04N 21/4431; H04N 21/42638; H04N 21/47; H04N 21/2365; H04N 21/2385

USPC .......................................................... 725/14
See application file for complete search history.

(56) References Cited

U.S. PATENT DOCUMENTS

| | | |
|---|---|---|
| 6,985,190 B1 | 1/2006 | Klopfenstein et al. |
| 7,818,444 B2 | 10/2010 | Brueck et al. |
| 8,290,038 B1 | 10/2012 | Wang et al. |

(Continued)

FOREIGN PATENT DOCUMENTS

| | | |
|---|---|---|
| EP | 2823405 A2 | 1/2015 |
| EP | 3 300 355 A1 | 3/2018 |

(Continued)

OTHER PUBLICATIONS

European Search Report for EP 13757042 dated Dec. 4, 2015, all pages.

(Continued)

*Primary Examiner* — Cynthia M Fogg
(74) *Attorney, Agent, or Firm* — Kilpatrick Townsend & Stockton LLP

(57) ABSTRACT

Various arrangements for integrating over-the-air (OTA) television programming with streaming media are presented. An OTA integration module may request, from an OTA tuner device, a stream of an OTA television channel, wherein the OTA television channel is broadcast over a geographic region on the VHF band or UHF band. The OTA integration module may receive, from the OTA tuner device, the stream of the OTA television channel. The OTA integration module may provide, to a media presentation application, the stream of the OTA television channel. The media presentation application executed by the streaming media player device may output the steam of the OTA television channel for presentation.

15 Claims, 6 Drawing Sheets

(51) Int. Cl.
*H04H 20/61* (2008.01)
*H04H 20/71* (2008.01)

(56) References Cited

U.S. PATENT DOCUMENTS

| | | |
|---|---|---|
| 8,402,156 B2 | 3/2013 | Brueck et al. |
| 8,370,514 B2 | 5/2013 | Hurst et al. |
| 8,612,624 B2 | 12/2013 | Brueck et al. |
| 8,683,066 B2 | 3/2014 | Hurst et al. |
| 8,868,772 B2 | 10/2014 | Major et al. |
| 8,880,721 B2 | 11/2014 | Hurst et al. |
| 9,071,668 B2 | 6/2015 | Brueck et al. |
| 9,178,923 B2 | 11/2015 | Paul et al. |
| 9,716,856 B2 | 7/2017 | Lynch et al. |
| 2002/0136231 A1 | 9/2002 | Leatherbury et al. |
| 2003/0126607 A1 | 7/2003 | Phillips et al. |
| 2004/0078807 A1 | 4/2004 | Fries et al. |
| 2004/0201608 A1* | 10/2004 | Ma ............... H04N 21/4438 715/719 |
| 2005/0022241 A1 | 1/2005 | Griggs |
| 2005/0160461 A1 | 7/2005 | Baumgartner et al. |
| 2006/0026302 A1 | 2/2006 | Bennett et al. |
| 2007/0104456 A1 | 5/2007 | Craner |
| 2008/0162713 A1 | 7/2008 | Bowra et al. |
| 2008/0270933 A1 | 10/2008 | Straw et al. |
| 2008/0301746 A1 | 12/2008 | Wiser et al. |
| 2008/0301750 A1 | 12/2008 | Silfvast et al. |
| 2008/0311952 A1* | 12/2008 | Sugiyama ............ H04N 5/50 455/556.1 |
| 2008/0313671 A1* | 12/2008 | Batrouny ............ H04N 5/50 725/40 |
| 2009/0031386 A1* | 1/2009 | Chan ............... H04N 7/161 725/131 |
| 2009/0138907 A1 | 5/2009 | Wiser et al. |
| 2009/0142036 A1 | 6/2009 | Branam et al. |
| 2009/0144776 A1 | 6/2009 | Walter et al. |
| 2010/0031162 A1 | 2/2010 | Wiser et al. |
| 2010/0142597 A1 | 6/2010 | Zhang et al. |
| 2010/0218223 A1 | 8/2010 | Simpson et al. |
| 2010/0229205 A1* | 9/2010 | Hakusui ............ H04W 4/02 725/62 |
| 2010/0325666 A1 | 12/2010 | Wiser et al. |
| 2011/0016490 A1 | 1/2011 | Schaefer et al. |
| 2011/0016503 A1 | 1/2011 | Schaefer et al. |
| 2011/0038613 A1 | 2/2011 | Buchheit |
| 2011/0107376 A1* | 5/2011 | Lee ............... H04N 5/50 725/56 |
| 2011/0143667 A1 | 6/2011 | Cugnini et al. |
| 2011/0307929 A1 | 12/2011 | Youssefmir et al. |
| 2011/0307942 A1 | 12/2011 | Youssefmir et al. |
| 2012/0002000 A1 | 1/2012 | Guerrero |
| 2012/0002717 A1 | 1/2012 | Ma et al. |
| 2012/0005705 A1 | 1/2012 | Youssefmir et al. |
| 2012/0044426 A1 | 2/2012 | Ross et al. |
| 2012/0047535 A1 | 2/2012 | Bennett et al. |
| 2012/0141089 A1 | 6/2012 | Hunt |
| 2012/0314761 A1 | 12/2012 | Melnyk et al. |
| 2013/0236158 A1 | 9/2013 | Lynch et al. |
| 2014/0053207 A1* | 2/2014 | Shoykher ............ H04N 21/414 725/50 |
| 2014/0233923 A1 | 8/2014 | Bradley et al. |
| 2014/0270713 A1 | 9/2014 | Hybertson |
| 2015/0024738 A1* | 1/2015 | Anderson ......... H04W 36/0094 455/432.1 |
| 2015/0042882 A1 | 2/2015 | Park et al. |
| 2015/0074735 A1* | 3/2015 | Herigstad ............ H04N 21/488 725/110 |
| 2015/0135249 A1* | 5/2015 | Jeffery ............... H04N 21/2393 725/116 |
| 2016/0156987 A1 | 6/2016 | Paul et al. |
| 2016/0205420 A1 | 7/2016 | Ellis et al. |
| 2016/0255397 A1 | 9/2016 | Langan et al. |
| 2017/0034571 A1 | 2/2017 | Natarajan et al. |
| 2017/0142475 A1 | 5/2017 | Williams et al. |
| 2017/0289496 A1 | 10/2017 | Lynch et al. |
| 2018/0131990 A1 | 5/2018 | Desclos et al. |
| 2019/0208259 A1* | 7/2019 | Chaudhari ......... H04N 21/4147 |
| 2021/0043205 A1* | 2/2021 | Lee ............... G10L 15/28 |

FOREIGN PATENT DOCUMENTS

| | | |
|---|---|---|
| WO | 2013/134006 A2 | 9/2013 |
| WO | 2017/000751 A1 | 1/2017 |

OTHER PUBLICATIONS

Office Action for EP 13757042 dated Jun. 6, 2017, all pages.
International Search Report and Written Opinion for PCT/US2013/027612 dated May 10, 2013, all pages.
International Preliminary Report on Patentability for PCT/US2013/027612 dated Oct. 14, 2014, all pages.
International Search Report and Written Opinion for PCT/US2018/065489 dated Mar. 19, 2019, all pages.
U.S. Appl. No. 15/624,377, filed Jun. 15, 2017 Notice of Allowance dated Apr. 2, 2019, all pages.
U.S. Appl. No. 15/856,705, filed Dec. 28, 2017 Non-Final Rejection dated Feb. 6, 2019, all pages.
U.S. Appl. No. 15/856,705, filed Dec. 28, 2017 Final Rejection dated Jul. 31, 2019, all pages.
U.S. Appl. No. 15/856,705, filed Dec. 28, 2017 Notice of Allowance dated Dec. 2, 2019, all pages.

* cited by examiner

OVER-THE-AIR PROGRAMMING INTEGRATION WITH OVER THE TOP STREAMING SERVICES

BACKGROUND

An over the top (OTT) streaming service may be used to obtain media, such as television programs and movies, from a streaming service provider over the Internet. Over-the-air (OTA) programming may be received via an antenna that receives broadcast television channels that transmit on VHF (very high frequency) and UHF (ultra-high frequency) bands to a geographic area. Typically, if a user desires to switch between viewing or otherwise accessing OTT programming and OTA programming, the user needs to change a system used to receive and decode the programming. Such an arrangement can be cumbersome and inefficient.

SUMMARY

Various embodiments are described related to an integrated over-the-air (OTA) viewing system. In some embodiments, an integrated over-the-air (OTA) viewing system is described. The system may comprise a streaming media player device. The device may comprise a wireless network interface. The device may comprise a video output interface. The device may comprise one or more processors in communication with the wireless network interface and the video output interface. The one or more processors may be configured to execute instructions. The system may comprise an OTA integration module that may provide a same set of application programming interfaces (APIs) irrespective of a type of OTA tuner device, configured to request, from a first OTA tuner device, a stream of an OTA television channel. The OTA television channel may be broadcast over a geographic region on the VHF band or UHF band and receive, from the first OTA tuner device, the stream of the OTA television channel. The system may comprise a media presentation application. The media presentation application may be executed by the one or more processors of the streaming media player device. The media presentation application may receive streaming media via the wireless network interface and output the streaming media via the video output interface for presentation.

Embodiments of such a system may include one or more of the following features: the first OTA tuner device may be incorporated as part of the streaming media player device. The first OTA tuner device may be distinct from the streaming media player device and the first OTA tuner device may communicate with the OTA integration module via a wireless network. The OTA integration module may be further configured to transmit a command to trigger the OTA tuner device to perform scanning to identify OTA television channels that may be available to the OTA tuner device. The OTA integration module may be further configured to receive a list of available OTA television channels in response to the performed OTA television channel scanning. The OTA integration module may be further configured to provide the list of available OTA television channels to the media presentation application. The media presentation application may be configured to output the list of available OTA television channels received from the OTA integration module. The system may further comprise the first OTA tuner device and a second OTA tuner device. The OTA integration module may be further configured to maintain an indication of television channels that may be available from each of the first OTA tuner device and the second OTA tuner device. The OTA integration module may receive an indication of a signal strength measurement for each television channel that the first OTA tuner device and the second OTA tuner device may receive. The OTA integration module may be further configured to identify a television channel that may be received by both the first OTA tuner device and the second OTA tuner device. The OTA integration module being configured to request the stream of the OTA television channel from the first OTA tuner device may be at least partially based on the first OTA tuner device receiving the OTA television channel with a greater signal strength than the second OTA tuner device receives the OTA television channel. The first OTA tuner device may be distinct from the streaming media player device and the first OTA tuner device may communicate with the OTA integration module via a wireless network. The second OTA tuner device may be incorporated as part of the streaming media player device. The OTA integration module may be integrated as part of the media presentation application as a software development kit (SDK). The OTA integration module and the media presentation application may be executed as instructions by the one or more processors of the streaming media player device.

In some embodiments, a method for integrating over-the-air (OTA) television programming with streaming media is described. The method may comprise requesting, by an OTA integration module from a first OTA tuner device, a stream of an OTA television channel. A same set of application programming may interface (APIs) irrespective of a type of OTA tuner device. The OTA television channel may be broadcast over a geographic region on the VHF band or UHF band. The method may comprise receiving, by the OTA integration module from the first OTA tuner device, the stream of the OTA television channel. The method may comprise providing, by the OTA integration module to a media presentation application, the stream of the OTA television channel. The media presentation application may be executed by a streaming media player device. The method may comprise outputting, by the media presentation application executed by the streaming media player device, the stream of the OTA television channel for presentation.

Embodiments of such a method may include one or more of the following features: the first OTA tuner device may be incorporated as part of the streaming media player device. The first OTA tuner device may be distinct from the streaming media player device and the first OTA tuner device may communicate with the OTA integration module via a wireless network. The method may further comprise transmitting, by the OTA integration module, a command to trigger the first OTA tuner device to perform scanning to identify OTA television channels that may be available to the first OTA tuner device. The method may further comprise receiving, by the OTA integration module, a list of available OTA television channels in response to the performed OTA television channel scanning. The method may further comprise transmitting, by the OTA integration module, a second command to trigger a second OTA tuner device to perform scanning to identify OTA television channels that may be available to the second OTA tuner device. The method may comprise receiving, by the OTA integration module, a second list of available OTA television channels in response to the OTA television channel scanning performed by the second OTA tuner device. The method may further comprise maintaining, by the OTA integration module, an indication of television channels that may be available from each of the first OTA tuner device and the second OTA tuner device. The method may further comprise receiving, by the OTA integration module, an indication of a signal strength measurement for each television channel that the first OTA tuner device and the second OTA tuner device may receive. The method may further comprise identifying, by the OTA integration module, based on the indication of television channels that may be available from each of the first OTA tuner device and the second OTA tuner device, that the OTA television channel may be received by both the first OTA tuner device and the second OTA tuner device. The OTA integration module being configured to request the stream of the OTA television channel from the first OTA tuner device may be at least partially based on the first OTA tuner device receiving the OTA television channel with a greater signal strength than the second OTA tuner device receives the OTA television channel.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Streaming media player devices allow a user to view streaming content provided by one or more streaming media services. Some streaming media player devices come either preloaded with applications or applications can be downloaded from an app store. Different applications may allow for media to be streamed from different streaming media services.

While streaming media services may provide access to a large selection of content, such services may be deficient in providing access to television channels that can be received via an over-the-air (OTA) antenna for free. Network television affiliates, independent television channels, and other types of television channels may broadcast OTA television channels over a geographic region using VHF (very high frequency) band and UHF (ultra-high frequency) band transmissions. A user may desire to receive OTA television channels in addition to having access to streaming media services.

Depending on the user's hardware setup, the streaming media player may have one or more integrated OTA tuners, the streaming media player may be connected directly (e.g., via USB) to a local OTA tuner device, or the streaming media player may communicate with an OTA tuner device via a network. Since streaming media players and OTA tuner devices are available from many manufacturers, many possible combinations of streaming media players, OTA tuner devices, and local vs. network-based setups may be possible. Embodiments detailed herein disclose how an OTA integration module can serve as an intermediary between an application that outputs media for presentation and one or more OTA tuner devices, which may be manufactured by disparate manufacturers and located in disparate locations.

Figure 1:
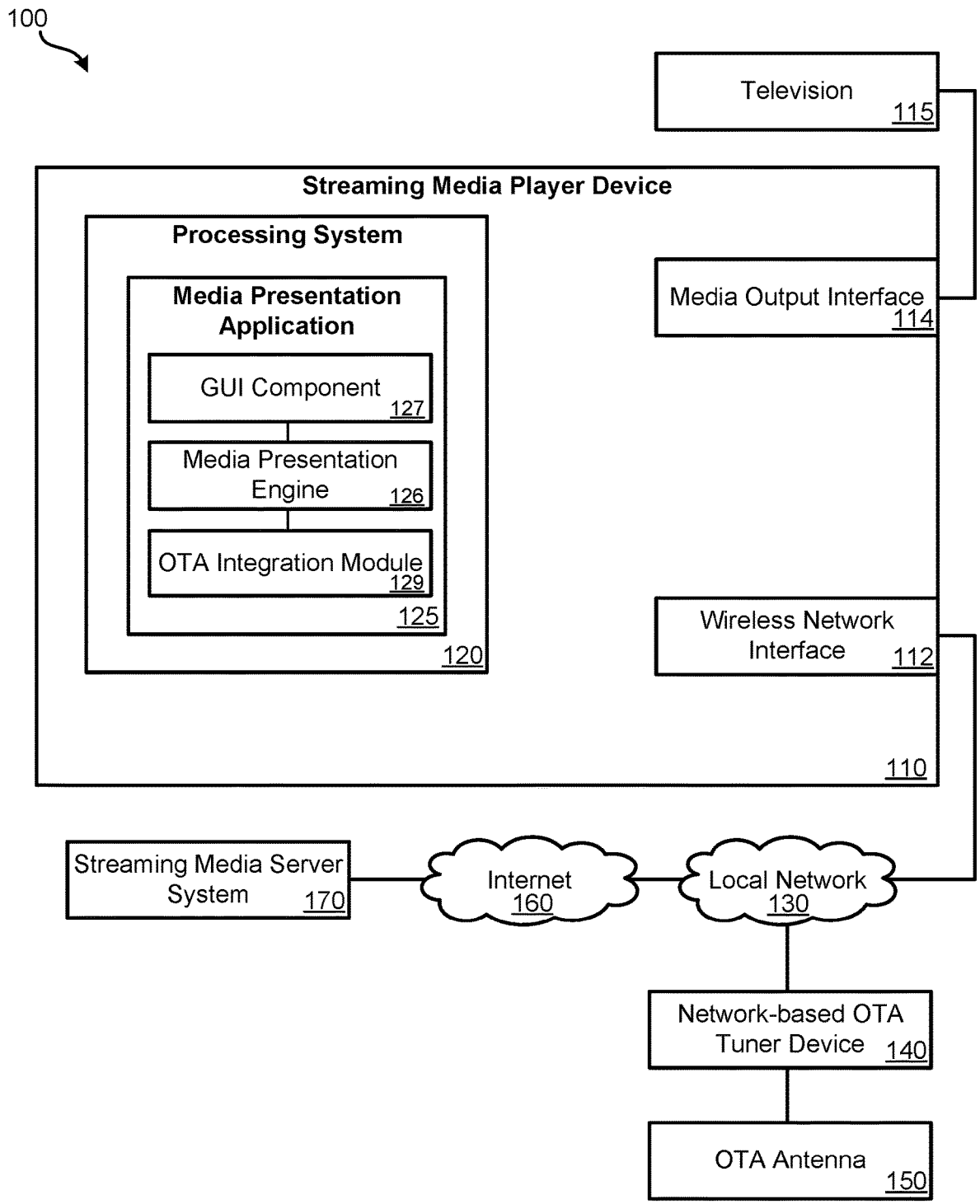
FIG. 1 illustrates an embodiment of an integrated OTA viewing system in which an OTA tuner device is accessible by a streaming media player device via a network.

FIG. 1 illustrates an embodiment of an integrated OTA viewing system 100 in which an OTA tuner device is accessible by a streaming media player device via a network. Integration OTA viewing system 100 can include: streaming media player device 110; television 115; local network 130; network-based OTA tuner device 140; OTA antenna 150; internet 160; and streaming media server system 170. The embodiment of FIG. 1 is directed to an arrangement where a single network-based OTA tuner device is in communication with streaming media player device 110 via local network 130.

Streaming media player device 110 may be a stand-alone computerized device or a computerized device that is connected to another device to which audio and video is output. For instance, streaming media player device 110 may be a tablet computer, smartphone, gaming device, smart television, some other form of device with an integrated display and audio output componentry, or some other form of media streamer or set top box connected with a television. In some embodiments, media output interface 114 may not be present. In other embodiments, streaming media player device 110 outputs content to another device for presentation, such as by outputting video (and, possibly, sound) via media output interface 114 to television 115. Such an embodiment streaming media player device 110 can involve a user interacting with streaming media player device 110 via a remote control or virtual remote control.

Streaming media player device 110 may include processing system 120. Processing system 120 can include one or more processors and one or more non-transitory processor-readable mediums. Processing system 120 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using the one or more non-transitory processor-readable mediums, such as random access memory (RAM), flash memory, a hard disk drive (HDD), or a solid state drive (SSD).

One or more applications may come preinstalled on streaming media player device 110. Additionally or alternatively, one or more additional applications may be downloaded or otherwise added to streaming media player device 110. For example, a user may be able to access an "app" store to select one or more additional applications to acquire. Media presentation application 125 may be an application that is either preinstalled on streaming media player device 110 or may have been added by a user.

Media presentation application 125 may be used to access streaming content provided by streaming media server system 170. Media presentation application 125 may include media presentation engine 126 and graphic user interface (GUI) component 127. GUI component 127 may present indications of streaming media that can be streamed from streaming media server system 170. GUI component 127 may also indicate television channels that can be presented live from a network-based OTA tuner device.

Media presentation engine 126 may include multiple software components that are responsible for retrieving and organizing streaming media from streaming media server system 170 and from OTA integration module 129. Media presentation engine 126 may not be configured to communicate with any particular type of network-based OTA tuner device. Rather, media presentation engine 126 may only be configured to create standardized calls to OTA integration module 129. From the point of view of media presentation engine 126, OTA integration module 129 is the source of all OTA television channels. The location, type, and number of network-based OTA tuner devices with which OTA integration module 129 communicates may be invisible to media presentation engine 126.

Media presentation application 125 may obtain indications of OTA television channels that can be incorporated into the GUI output by GUI component 127 via OTA integration module 129. OTA integration module 129 may be a software development kit (SDK) or other form of software component that provides indications of television channels and, possibly, signal strengths available from one or more network-based OTA tuner devices in a standardized format. Media presentation application 125 may be created by a service provider unrelated to the manufacturer of any network-based OTA tuner device that is in communication with media presentation application 125. However, by OTA integration module 129 serving as an intermediary, OTA integration module 129 handles communication with the one or more network-based OTA tuner devices and provides media presentation application 125 with streams of television channels and information about the television channels in a standardized format.

OTA integration module 129 may represent an SDK that can be incorporated directly into media presentation application 125. Such a SDK can be used to incorporate code modules directly into media presentation application 125 that allows for communication with one or more network-based OTA tuner devices that is manufacturer-agnostic and system-location agnostic. That is, software components of media presentation application outside of OTA integration module 129, such as media presentation engine 126 does not need to have any specific data about the one or more network-based OTA tuner devices with which streaming media player device 110 communicates. By communicating via OTA integration module 129, multiple network-based OTA tuner devices from different manufacturers in different locations within system 100 can be accommodated.

Specifically, OTA integration module 129 may expose a single set of application programming interfaces (APIs) to components of media presentation application 125 irrespective of a type of OTA tuner device. Therefore, regardless of the location of the OTA tuner device, the number of OTA tuner devices, and/or the specifics of the make or model of the one or more OTA tuner devices, the same APIs can be used by medial presentation application 125 to obtain indications of OTA programing and receive OTA television channel streams via OTA integration module 129.

In some embodiments, OTA integration module 129 may be external to media presentation application 125. OTA integration module 129 may be executed as a separate application or executable from media presentation application 125. In some embodiments, media presentation application 125 may trigger execution of OTA integration module 129 when access to one or more network-based OTA tuner devices is needed.

Streaming media player device 110 may include wireless network interface 112. Wireless network interface 112 may use Wi-Fi (IEEE 802.11) to communicate with a wireless network access point (AP). Local network 130 may be created by such an AP. Local network 130 may enable high-speed communication with devices connected to local network 130 and, possibly, access to another network, such as the Internet 160. Streaming media player device 110 may communicate with streaming media server system 170 via Internet 160 and local network 130. Therefore, streaming media may be transmitted in the form of packets to streaming media player device via Internet 160 and local network 130.

Connected with local network 130 may be network-based OTA tuner device 140. Network-based OTA tuner device 140 may be a stand-alone device that connects with OTA antenna 150, receives one or more OTA television channels, packetizes (and possibly transcodes) the one or more OTA television channels, and transmits the one or more OTA television channels to OTA integration module 129 via local network 130. In other embodiments, network-based OTA tuner device 140 may be located on a remote network and may use the internet to transmit the one or more OTA television channels to OTA integration module 129.

Network-based OTA tuner device 140 may be installed in a location where it is convenient to connect OTA antenna 150 and place OTA antenna 150 in a location that will be receive strong OTA television channel signals. OTA television channels may be broadcast on VHF or UHF bands in either a digital or an analog format. Such OTA television channels are broadcast by television channels for free reception by anyone within range of the transmitted signal.

OTA antenna 150 may be installed in a location where there are few obstructions between the broadcast towers and OTA antenna 150. In some embodiments, OTA antenna 150 may be mounted in a window of a home in which streaming media player device 110 is installed. In other embodiments, a roof-top installation location may be used for network-based OTA tuner device 140. An electrical connection, such as coaxial cable, may be used to connected OTA antenna 150 to network-based OTA tuner device 140. The connection between network-based OTA tuner device 140 and local network 130 may be wireless (e.g., Wi-Fi) or wired.

Network-based OTA tuner device 140 may require a set-up process be initially performed. OTA integration module 129 may use an API (application programming interface) to access network-based OTA tuner device 140. Specifically, all network-based OTA tuner devices, regardless of manufacturer, may be configured to respond to several commands indicated in Table 1.

TABLE 1

| Command | Purpose |
| --- | --- |
| OTA_Channel_Scan | OTA integration module triggers the OTA tuner device to scan for available television channels |
| Get_Channel_List | Requests a list of television channels that were identified as available during the scan |
| Get_Programming | Requests output of a television channel in a transport stream format or some other format |

The names of commands within Table 1 are merely exemplary; in other embodiments, the commands may be named differently and/or could perform modified functions. For instance, a single command may replace "OTA_Channel_Scan" and "Get_Channel_List."

When an OTA tuner device, such as network-based OTA tuner device 140 is being initially configured, OTA integration module 129 may receive a trigger from media presentation application 125 to configure the OTA tuner device. Media presentation application 125 may not have any information about the specific location of the OTA tuner device within system 100. OTA integration module 129 may locate network-based OTA tuner device 140 and transmit the "OTA_Channel_Scan" command from Table 1. This command may trigger network-based OTA tuner device 140 to tune to each possible channel and determine a signal strength. A television channel may be determined to be available if the signal strength is above a defined signal strength threshold. After the scan has been completed, a message indicating as such may be received by OTA integration module 129.

Once the scan has been completed, OTA integration module may transmit the "Get_Channel_List" command to network-based OTA tuner device 140. In response to this command, network-based OTA tuner device 140 may respond with a list of available television channels. For each television channel, a channel number, call-sign, signal strength, or some combination thereof may be provided by network-based OTA tuner device 140. OTA integration module 129 may output indications of the available channels, call-signs, signal strengths, or some combination thereof to GUI component 127. Components of media presentation application 125 outside of OTA integration module 129 may have no information on the specifics of network-based OTA tuner device 140, such as location within system 100, manufacturer, model, etc. When media presentation application 125 is to output an OTA television channel for presentation (e.g., to television 115 via media output interface 114), OTA integration module 129 may transmit the "Get_Programming" command, which may trigger a stream of the requested television channel to be transmitted to OTA integration module 129. OTA integration module 129 may format the received stream of the television channel into a form appropriate to be output to media presentation engine 126 and for presentation by GUI component 127.

Figure 2:
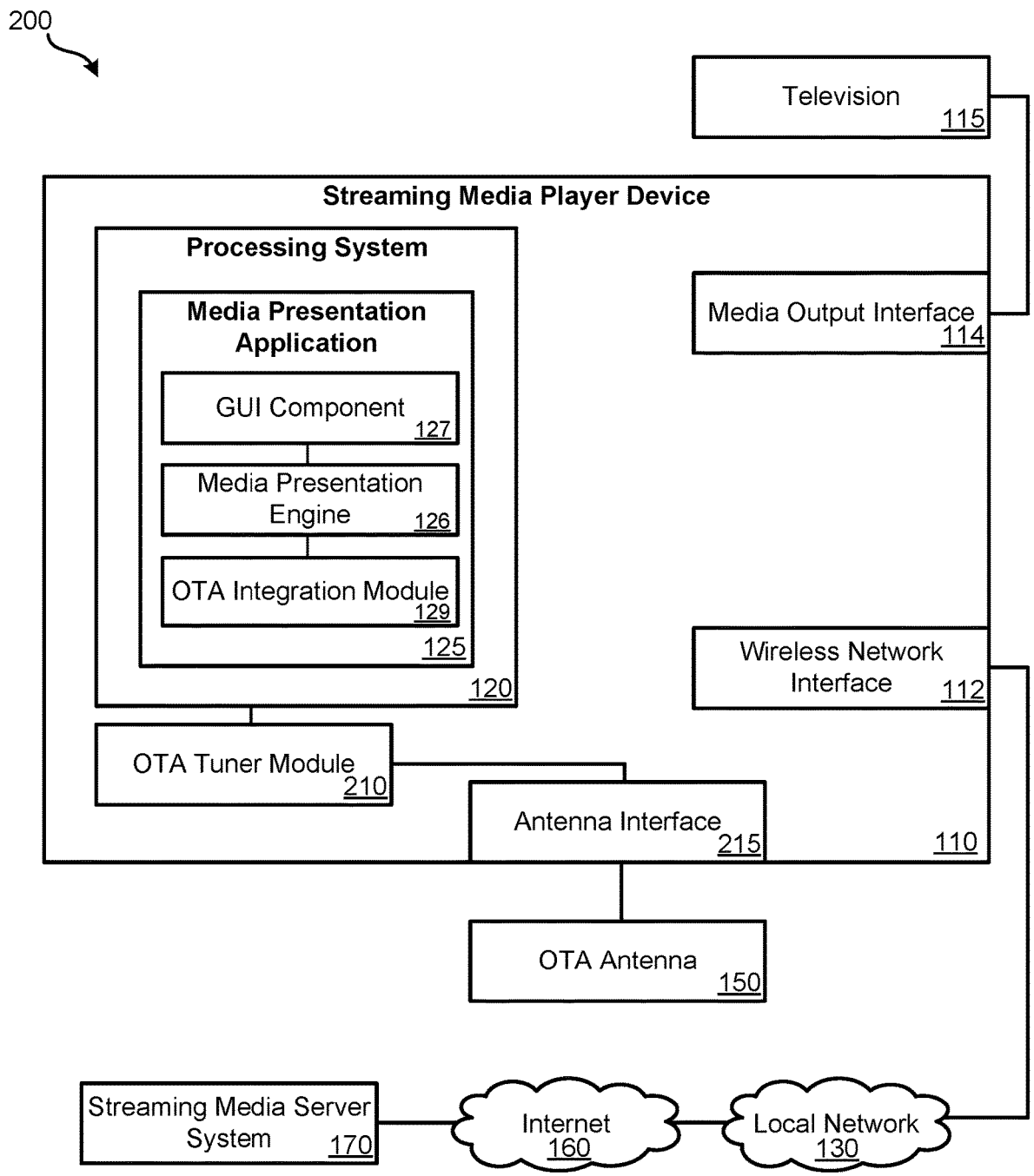
FIG. 2 illustrates an embodiment of an integrated OTA viewing system in which an OTA tuner is incorporated as part of a streaming media player device.

FIG. 2 illustrates an embodiment of an integrated OTA viewing system 200 in which an OTA tuner is incorporated as part of a streaming media player device. System 200 may function similarly to system 100, except for the differences noted below.

In system 200, OTA tuner module 210 is incorporated as part of streaming media player device 110. In a variation on system 200, OTA tuner module 210 may be incorporated as part of a peripheral that communicates with streaming media player device through a communication port (e.g., USB). OTA tuner module 210 can be connected with antenna interface 215. Antenna interface 215 may be electrically connected with OTA antenna 150, such as via coaxial cable. Therefore, a cable may connect streaming media player device (or a peripheral connected with streaming media player device) with OTA antenna 150. Within this document, an OTA tuner device can refer to a network-based OTA tuner device (e.g., network-based OTA tuner device 140), an OTA tuner module incorporated as part of a streaming media player device (e.g., OTA tuner module 210), or an OTA tuner module that is electrically connected to a streaming media player device as a peripheral.

From the point of view of software components of media presentation application 125 other than OTA integration module 129, the location of OTA tuner module 210 may be unknown. Therefore, television channels may be advertised for selection and may be presented by GUI component 127 similarly to in system 100. OTA integration module 129 handles communication with OTA tuner module 210. In system 200, no network communication is needed for communication between OTA integration module 129 and OTA tuner module 210 since OTA tuner module 210 is incorporated as part of streaming media player device 110 (or is directly connected as a peripheral).

Figure 3:
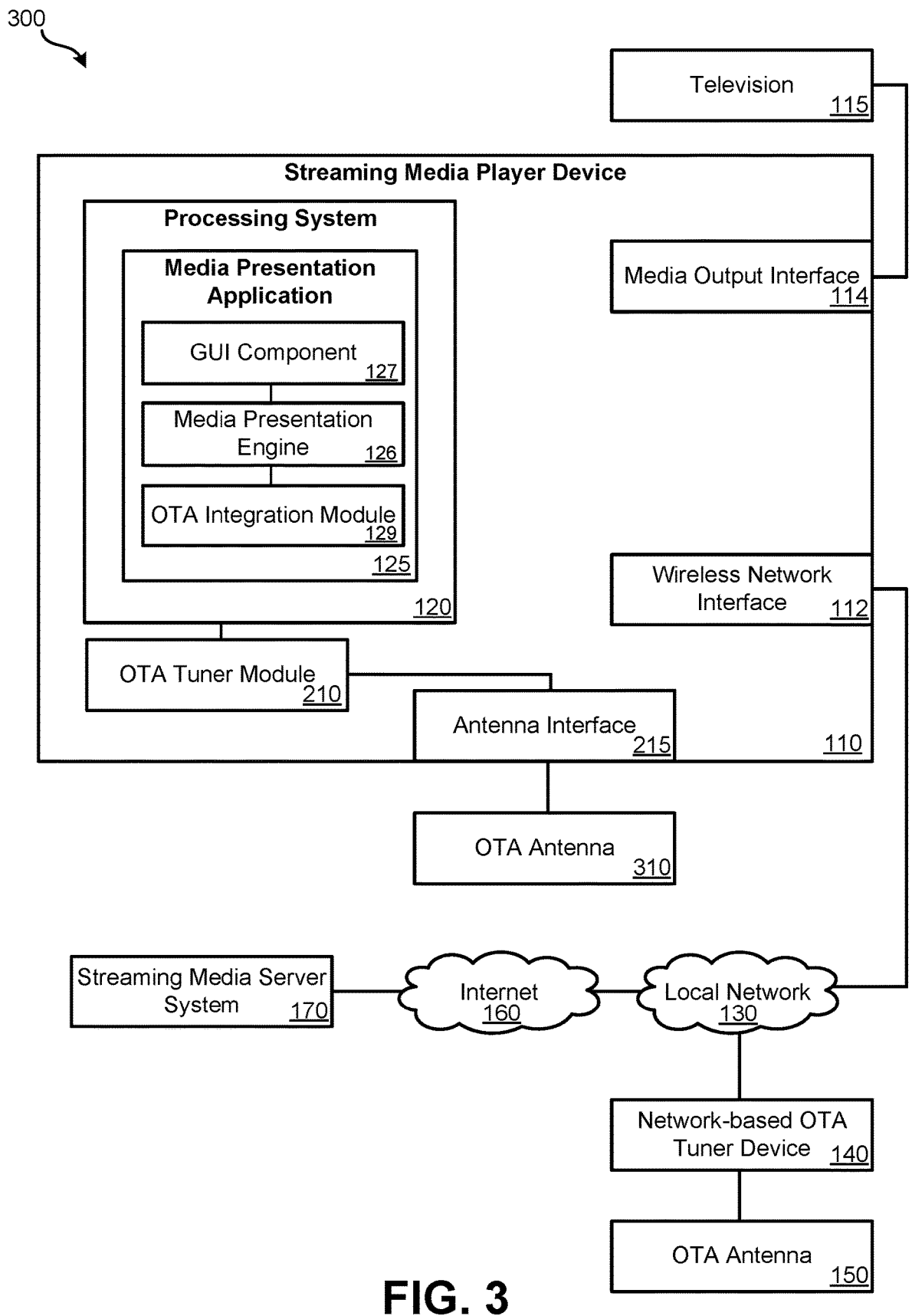
FIG. 3 illustrates an embodiment of an integrated OTA viewing system in which a first OTA tuner device is accessible by a streaming media player device via a network and an OTA tuner is incorporated as part of a streaming media player device.

FIG. 3 illustrates an embodiment of an integrated OTA viewing system 300 in which a first OTA tuner device is accessible by a streaming media player device via a network and an OTA tuner is incorporated as part of a streaming media player device. In system 300, multiple OTA antennas are present. Such an embodiment may be useful if the broadcast locations for different television channels are located in different directions. Separate antennas may be pointed in different directions. Alternatively, a style of antenna may be particularly suited to receiving certain television channels. For instance, a Yagi antenna may be used for UHF reception while a log-periodic antenna may be used for VHF reception. Therefore, OTA antenna 310 may be pointed in a different direction and/or may be a different style than OTA antenna 150.

In system 300, components of media presentation application 125 may function as in systems 100 and 200, even though multiple OTA tuners are present. However, OTA integration module 129 may modify its behavior to accommodate multiple sources of OTA programming. OTA integration module 129 may perform a set up process on both OTA tuner module 210 (which is connected with OTA antenna 310) and network-based OTA tuner device 140 (which is connected with OTA antenna 150 distinct from OTA antenna 310). OTA integration module 129 may maintain a listing of television channels available from each tuner. For the situation in which a particular television channel is available from both tuners, OTA integration module 129 may store data that is indicative of which tuner receives the television channel with a greater signal strength. In some embodiments, signal strength is evaluated when the initial scan is performed. In other embodiments, in response to OTA integration module 129 receiving a request to output a particular television channel, a signal strength check may be performed.

OTA integration module 129 may select the tuner to use as the source for the OTA television channel based on signal strength. Based on changing signal conditions, OTA integration module 129 may switch which tuner is used for receiving the television channel. From the point of view of software components of media presentation application 125, the source of the television channel may be invisible. That is, OTA integration module 129 may monitor which television channel can be received from which tuner.

Figure 4:
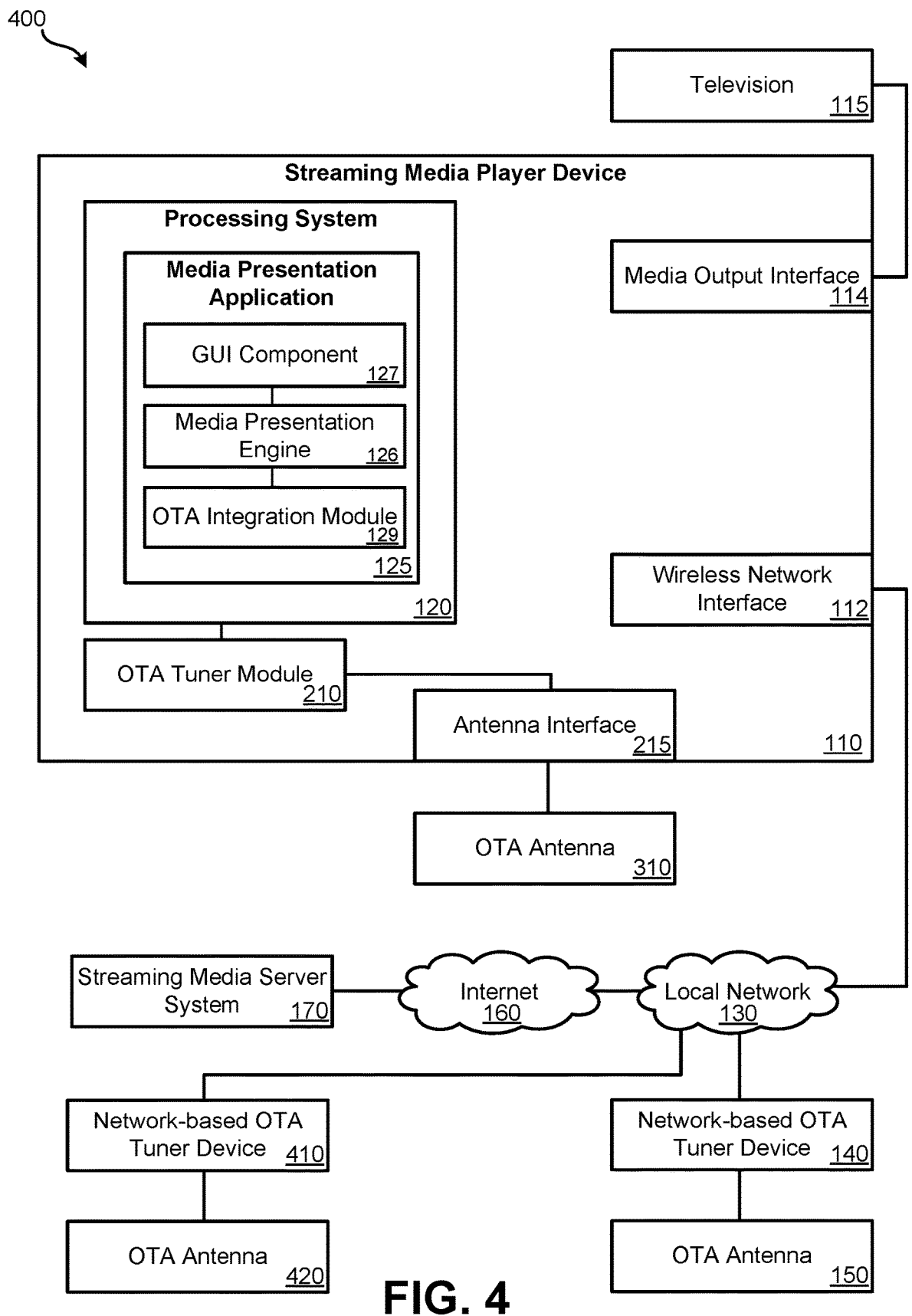
FIG. 4 illustrates an embodiment of an integrated OTA viewing system in which multiple OTA tuner devices are accessible by a streaming media player device via a network.

Having multiple tuner devices remotely incorporated as part of the system is also possible. FIG. 4 illustrates an embodiment of an integrated OTA viewing system 400 in which multiple OTA tuner devices are accessible by a streaming media player device via a network. Except as otherwise detailed, system 400 may function similarly to systems 100, 200, and 300.

In system 400, two network-based OTA tuner devices are present, network-based OTA tuner device 410, which is connected to OTA antenna 420, and network-based OTA tuner device 140, which is connected to OTA antenna 150. Such an embodiment may be useful if the broadcast locations for different television channels are located in different directions. Separate antennas may be pointed in different directions. Alternatively, the type of antenna of OTA antennas 420 and 150 may be varied. Additionally, the features of network-based OTA tuner devices 140 and 410 may vary due to being different models or being made by different manufacturers.

In system 400, OTA integration module 129 communicates with three tuners: OTA tuner module 210; network-based OTA tuner device 140; and network-based OTA tuner device 410. OTA integration module 129 maintains records of which television channels are available from each OTA tuner device. OTA integration module 129 maintains records indicative of television channels that are received from two (or more) tuners and which tuner device receives the channel with the highest signal strength. For instance, Table 2 represents records that may be stored by OTA integration module 129 using a non-transitory processor-readable medium.

TABLE 2

| Channel | Call-sign | Tuner | Signal Strength |
|---------|-----------|------------|-----------------|
| 4.1 | WFDJ | Network(1) | Good |
| 7.1 | WNBC | Network(1) | Good |
| 7.1 | WNBC | Network(2) | Great |
| 9 | WFXT | Local | OK |

From the perspective of components of media presentation application 125 (other than OTA integration module 129), there may be no visibility into the source of where the OTA channels are received. OTA integration module 129 may have discretion on which tuner device to use for a particular television channel. For instance, in the example of Table 2, for channel 7.1, OTA integration module 129 would select the tuner labelled "Network(2)" (which, for example, could correspond to OTA antenna 420) based on the signal strength measurements.

In addition to the embodiments of FIGS. 1-4, it should be understood that an OTA integration module may be used to manage other permutations of OTA tuners. In short, one or more OTA tuners may be incorporated or connected with the streaming media player device, one or more OTA tuner devices may be connected with a local network and in communication with the OTA integration module; one or more OTA tuner devices may be connected with the Internet and in communication with the OTA integration module; or some combination thereof.

Figure 5:
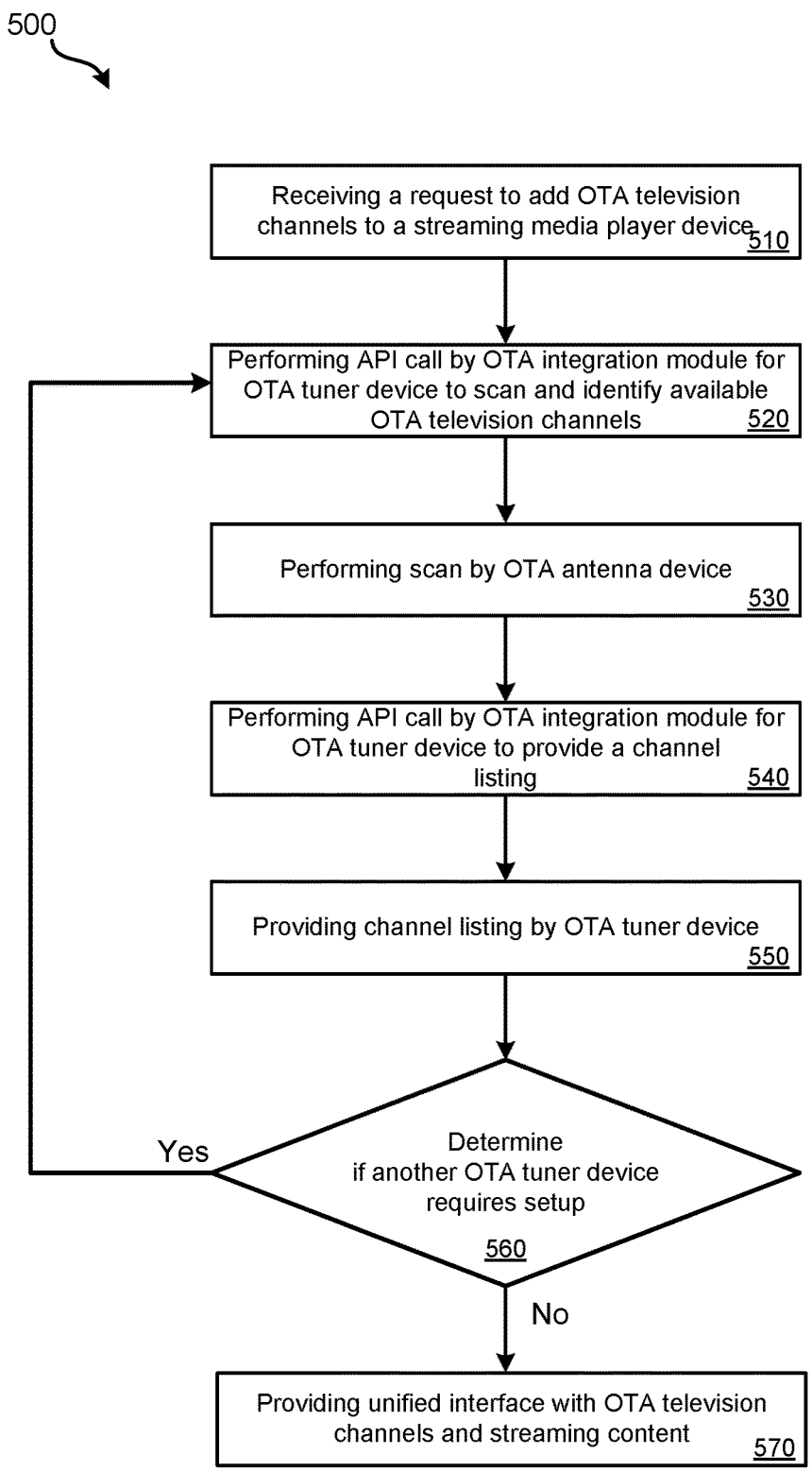
FIG. 5 illustrates an embodiment of a method for using an OTA integration module to configure OTA tuner devices.

Various methods may be performed using the systems detailed in relation to FIGS. 1-4. FIG. 5 illustrates an embodiment of a method for using an OTA integration module to configure OTA tuner devices. Method 500 may be performed with any of systems 100 through systems 400 or some other form of system that is configured to use an OTA integration module to manage communication with OTA tuner devices.

At block 510, a request to add OTA television channels to a streaming media player device. Block 510 may include a user submitting a command to the streaming media player device that indicates that a new tuner device should be searched for and located on. A command may be passed to an OTA integration module to either find one or more new OTA tuners or reconfigure one or more previously setup tuners.

At block 520, the OTA integration module may locate a new tuner device and/or may locate a previously-configured OTA tuner device that is eligible for configuration. Such an OTA tuner devices may be incorporated with or directly connected with the streaming media player device, such as OTA tuner module 210, or may be accessible via a wireless network, such as network-based OTA tuner device 140. The OTA integration module may, via an API, transmit a channel scan request to the OTA tuner module or OTA tuner device. This command may trigger the OTA tuner to identify each available television channel at block 530. The outcome of block 530 may be an indication of which channels are available, each available channel's call-sign and channel number, and a measured signal strength.

At block 540, the OTA integration module, via an API call, such as indicated in Table 1, may request a channel listing of all available channels from the OTA tuner device. In response, at block 550, either the streaming media device or the network-based OTA tuner device may respond with a list of available channels based on the previously-performed channel scan of block 530. The list may indicate the channel number, channel call-sign, and/or signal strength of the television channel as received by the tuner device via the connected OTA antenna.

At block 560, the OTA integration module may make a determination whether another OTA tuner module or OTA tuner device is present. If so, method 500 may repeat blocks 520-560. Otherwise method 500 may proceed to block 570. At block 570, the OTA integration module may output an indication of all the television channels that can be received via the one or more OTA tuner and/or OTA tuner devices. The OTA integration module may eliminate indications of duplicate television channels received by multiple OTA tuner devices (if multiple tuners are present). The OTA integration module may output the indication of each OTA channel to a component of the media presentation application, such as a media presentation engine, in a consistent format regardless of the OTA tuner module or OTA tuner device from which the OTA integration module received the OTA television channel. In some embodiments, the indication for each OTA channel is the channel number and/or call-sign of the television channel. These indications may be incorporated as part of an interface that allows a user to select between viewing streaming content available via a streaming media server (e.g., streaming media server system 170 of FIG. 1) and OTA television channels received via one or more OTA tuners incorporated as part of or directly connected with the streaming media player device or OTA tuner devices.

Figure 6:
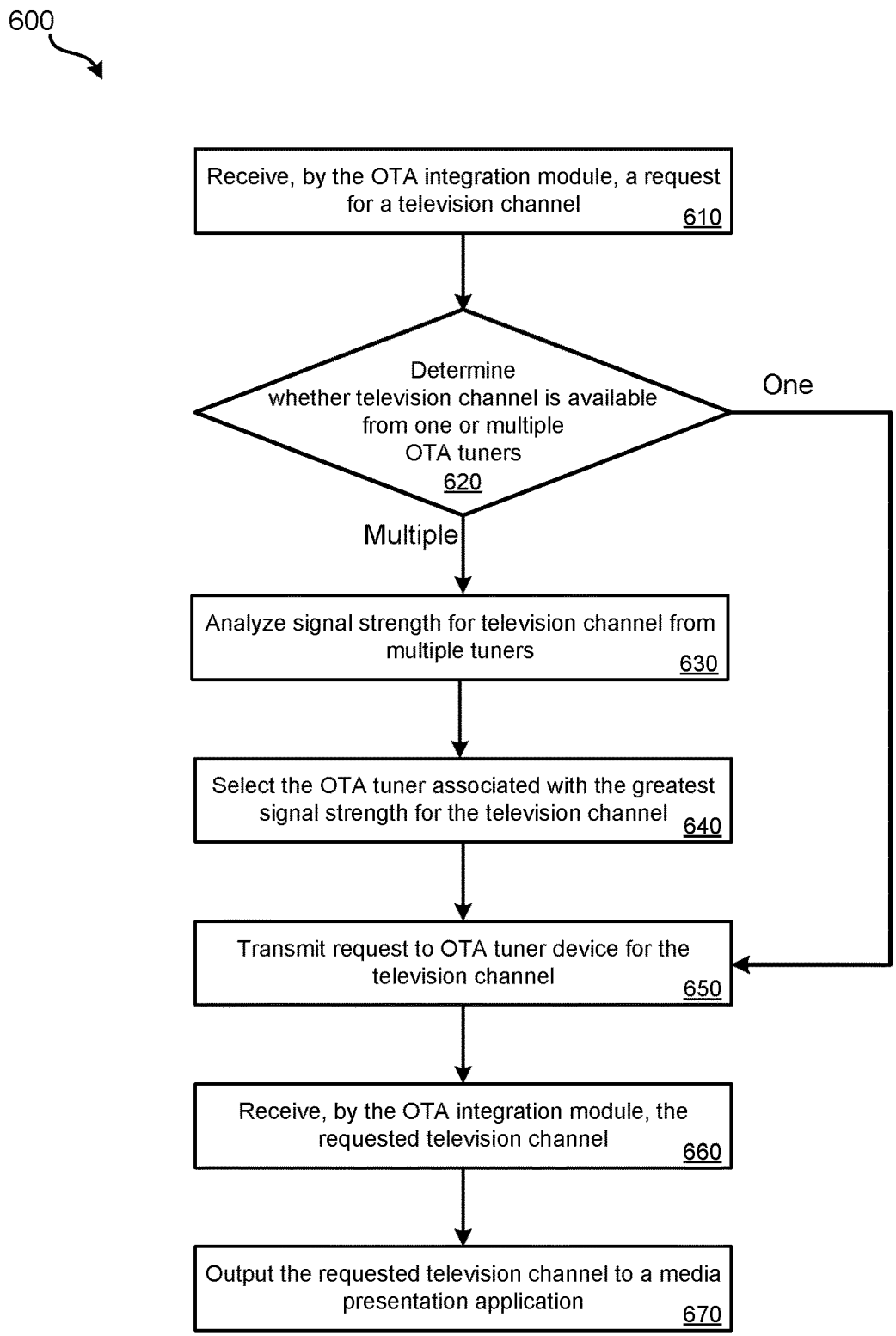
FIG. 6 illustrates an embodiment of a method for using an OTA integration module to stream a television channel from an OTA tuner device.

FIG. 6 illustrates an embodiment of a method 600 for using an OTA integration module to stream a television channel from an OTA tuner device. Method 600 may be performed with any of systems 100 through 400 or some other form of system that is configured to use an OTA integration module to manage communication with OTA tuner devices.

At block 610, the OTA integration module may receive a request for a particular OTA television channel. The request may not indicate the particular OTA tuner module or the location of the OTA tuner. The request may be provided by media presentation engine 126 or some other software component of the media presentation application. The OTA integration module may be functioning as part of the media presentation application or may be separately executed. The request for the OTA television channel may originate with a user submitting a request to view the OTA television channel or a DVR record timer being set to record the OTA television channel.

At block 620, a determination may be made by the OTA integration module whether the requested television channel of block 610 is available from multiple one or multiple OTA tuner module or OTA tuner devices. If the OTA television channel is only available from one OTA tuner module or OTA tuner device, method 600 may proceed to block 650. However, if the OTA television channel is available from multiple OTA tuner module or OTA tuner devices, method 600 may proceed to block 630.

At block 630, the signal strength for the requested television channel is analyzed for each OTA tuner module or OTA tuner device on which the television channel is available. At block 640, the OTA tuner module or OTA tuner device exhibits the greatest signal strength for the television channel is selected. Which OTA tuner module or OTA tuner device exhibits the greatest signal strength may be highly dependent on the type, direction, and location of OTA antenna connected with each OTA tuner module or OTA tuner device. In some embodiments, rather than blocks 620 through 640 being performed after block 610, the OTA integration module may occasionally assess signal strength for all television channels that can be received via multiple OTA tuners or OTA tuner devices. In such an embodiment, the OTA integration module can have stored data that indicates which OTA tuner module or OTA tuner device should be used to receive the OTA television channel when it is requested.

At block 650, a request, which can be in the form of an API call, is transmitted to the OTA tuner module or OTA tuner device. The OTA integration module can have stored information that indicates how to communicate with each OTA tuner module or OTA tuner device. Referring to Table 1, the API call may include a "Get_Programming" command that includes an indication of the requested OTA television channel (e.g., a channel number). In response, the OTA tuner module or OTA device may tune to the broadcast of the requested OTA television channel and transmit a stream of the OTA television channel to OTA integration module. The stream may be transmitted using a standardized compressed media format, such as MPEG-4.

At block 670, the requested OTA television channel may be output by the OTA integration module to a software component of the media presentation application being executed by the streaming media player device. For instance, the media presentation engine may receive the stream of the OTA television channel from the OTA integration module. From the point-of-view of the media presentation engine, the tuner that serves as the source of the OTA television channel is hidden. Rather, the media presentation engine treats the OTA integration module as the source of the OTA television channel and the OTA integration module handles all of the back-end retrieval of the OTA television channel. The OTA television channel may then be output for presentation, recorded to a non-transitory storage medium, or both.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An integrated over-the-air (OTA) viewing system, comprising:
   a streaming media player device, comprising:
      a wireless network interface;
      a video output interface;
      one or more processors in communication with the wireless network interface and the video output interface, wherein the one or more processors are configured to execute instructions;
   an OTA integration module that provides a same set of application programming interfaces (APIs), irrespective of a type of OTA tuner device, to code modules of a media presentation application, wherein the OTA integration module is integrated as part of the media presentation application as a software development kit (SDK), configured to:
      receive, from a code module of the media presentation application, a standardized call for a stream of an OTA television channel;
      in response to the standardized call for the stream of the OTA television channel, request, from a first OTA tuner device connected directly with a local wireless network, the stream of the OTA television channel, wherein the OTA television channel is broadcast over a geographic region on the VHF band or UHF band; and
      receive, from the first OTA tuner device, the stream of the OTA television channel; and
   the media presentation application, wherein:
      the media presentation application is executed by the one or more processors of the streaming media player device; and the media presentation application receives streaming media via the wireless network interface and outputs the streaming media via the video output interface for presentation.

2. The integrated OTA viewing system of claim 1, wherein the OTA integration module is further configured to:
transmit a command to trigger the OTA tuner device to perform scanning to identify OTA television channels that are available to the OTA tuner device; and
receive a list of available OTA television channels in response to the performed OTA television channel scanning.

3. The integrated OTA viewing system of claim 2, wherein the OTA integration module is further configured to provide the list of available OTA television channels to the media presentation application and wherein the media presentation application is configured to output the list of available OTA television channels received from the OTA integration module.

4. The integrated OTA viewing system of claim 1, further comprising: the first OTA tuner device and a second OTA tuner device.

5. The integrated OTA viewing system of claim 4, wherein the OTA integration module is further configured to maintain an indication of television channels that are available from each of the first OTA tuner device and the second OTA tuner device.

6. The integrated OTA viewing system of claim 5, wherein the OTA integration module receives an indication of a signal strength measurement for each television channel that the first OTA tuner device and the second OTA tuner device receives.

7. The integrated OTA viewing system of claim 6, wherein the OTA integration module is further configured to:
identify a television channel that is received by both the first OTA tuner device and the second OTA tuner device, wherein:
the OTA integration module being configured to request the stream of the OTA television channel from the first OTA tuner device is performed at least partially based on the first OTA tuner device receiving the OTA television channel with a greater signal strength than the second OTA tuner device receives the OTA television channel.

8. The integrated OTA viewing system of claim 7, wherein:
the second OTA tuner device is incorporated as part of the streaming media player device.

9. The integrated OTA viewing system of claim 1, wherein the OTA integration module and the media presentation application are executed as instructions by the one or more processors of the streaming media player device.

10. A method for integrating over-the-air (OTA) television programming with streaming media, the method comprising:
receiving, by an OTA integration module, from a code module of a media presentation application, a standardized call for a stream of an OTA television channel;
requesting, by the OTA integration module from a first OTA tuner device, via a local wireless network with which the first OTA tuner device is connected, the stream of the OTA television channel, wherein:

a same set of application programming interfaces (APIs) irrespective of a type of OTA tuner device;
the OTA integration module is integrated as part of the media presentation application as a software development kit (SDK); and
the OTA television channel is broadcast over a geographic region on the VHF band or UHF band;
receiving, by the OTA integration module from the first OTA tuner device, the stream of the OTA television channel;
providing, by the OTA integration module to a media presentation application, the stream of the OTA television channel, wherein:
the media presentation application is executed by a streaming media player device; and
outputting, by the media presentation application executed by the streaming media player device, the stream of the OTA television channel for presentation.

11. The method for integrating OTA television programming with streaming media of claim 10, further comprising:
transmitting, by the OTA integration module, a command to trigger the first OTA tuner device to perform scanning to identify OTA television channels that are available to the first OTA tuner device; and
receiving, by the OTA integration module, a list of available OTA television channels in response to the performed OTA television channel scanning.

12. The method for integrating OTA television programming with streaming media of claim 11, further comprising:
transmitting, by the OTA integration module, a second command to trigger a second OTA tuner device to perform scanning to identify OTA television channels that are available to the second OTA tuner device; and
receiving, by the OTA integration module, a second list of available OTA television channels in response to the OTA television channel scanning performed by the second OTA tuner device.

13. The method for integrating OTA television programming with streaming media of claim 12, further comprising:
maintaining, by the OTA integration module, an indication of television channels that are available from each of the first OTA tuner device and the second OTA tuner device.

14. The method for integrating OTA television programming with streaming media of claim 13, further comprising:
receiving, by the OTA integration module, an indication of a signal strength measurement for each television channel that the first OTA tuner device and the second OTA tuner device receives.

15. The method for integrating OTA television programming with streaming media of claim 14, further comprising:
identifying, by the OTA integration module, based on the indication of television channels that are available from each of the first OTA tuner device and the second OTA tuner device, that the OTA television channel is received by both the first OTA tuner device and the second OTA tuner device, wherein:
the OTA integration module being configured to request the stream of the OTA television channel from the first OTA tuner device is performed at least partially based on the first OTA tuner device receiving the OTA television channel with a greater signal strength than the second OTA tuner device receives the OTA television channel.

* * * * *